Figure 1:
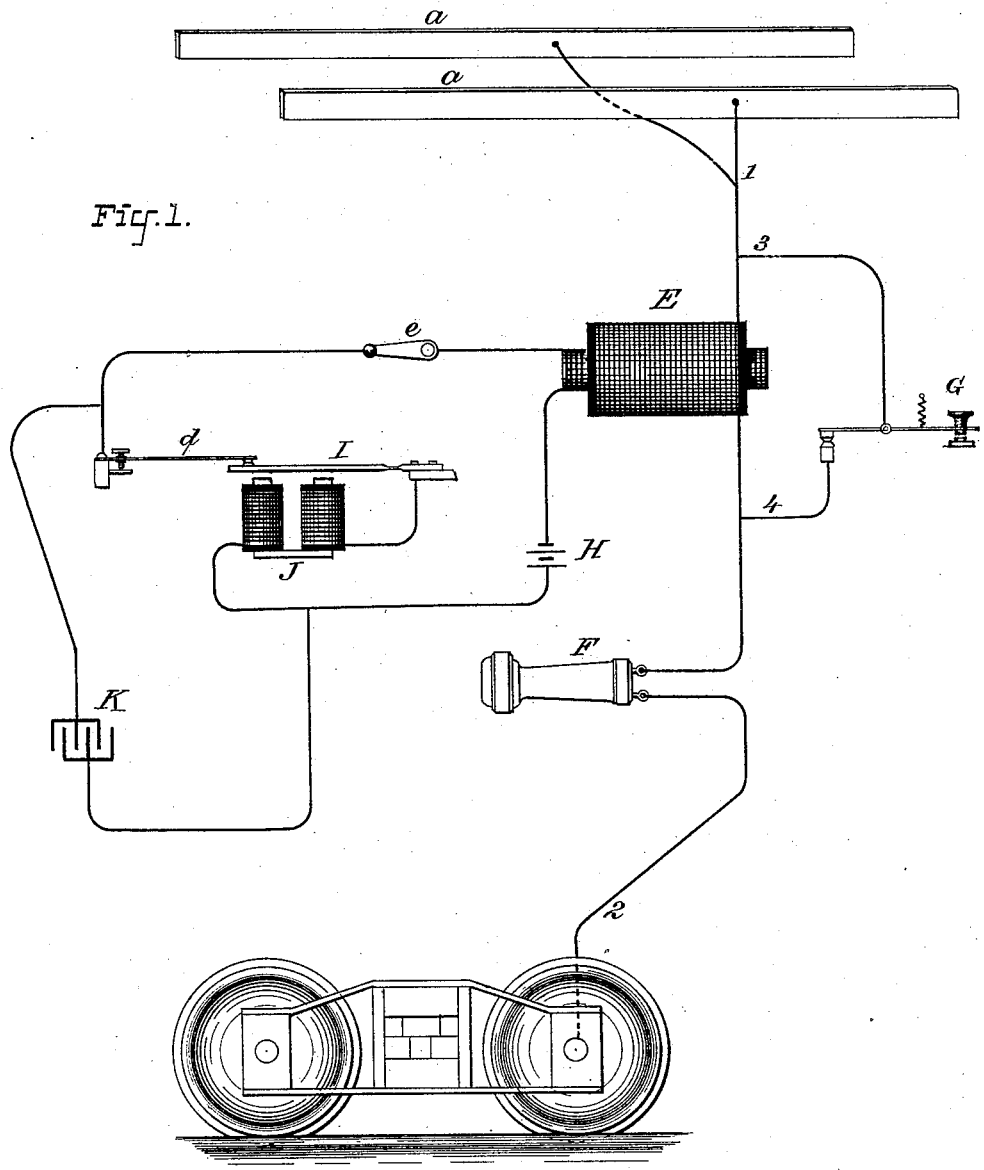

(No Model.) 3 Sheets—Sheet 1.

T. A. EDISON & E. T. GILLILAND.
SYSTEM OF RAILWAY SIGNALING.

No. 486,634. Patented Nov. 22, 1892.

ATTEST:

INVENTORS:

(No Model.) 3 Sheets—Sheet 2.
T. A. EDISON & E. T. GILLILAND.
SYSTEM OF RAILWAY SIGNALING.
No. 486,634. Patented Nov. 22, 1892.
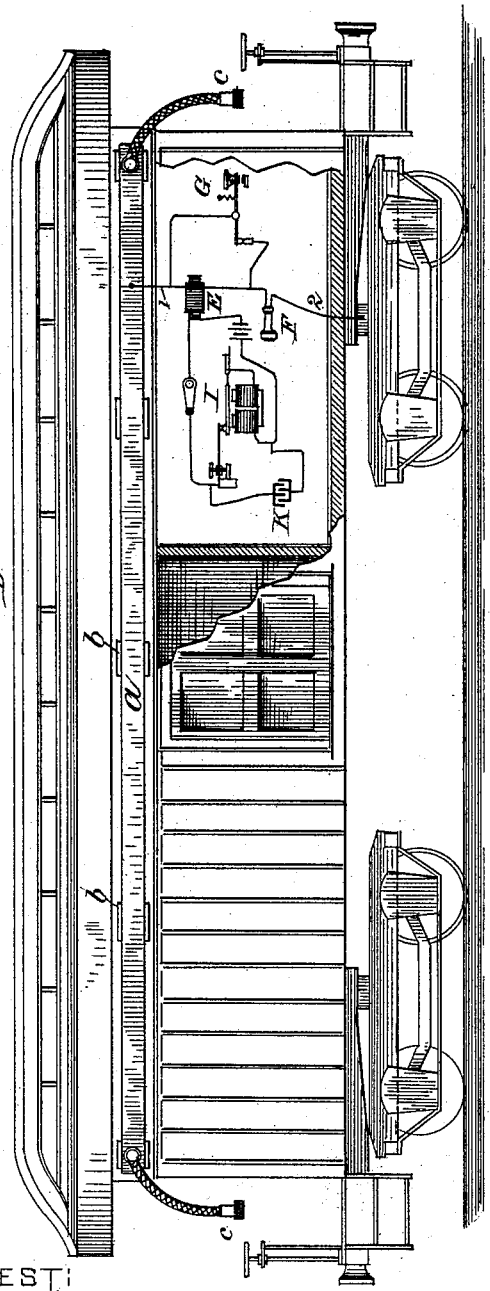
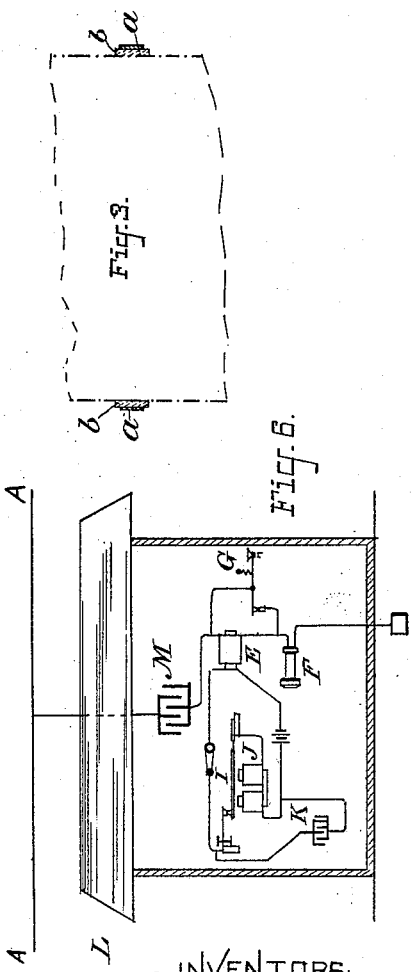
ATTEST:
INVENTORS:
Thomas A. Edison
Ezra T. Gilliland
By Dyer & Seely
Attys.

(No Model.) 3 Sheets—Sheet 3.
T. A. EDISON & E. T. GILLILAND.
SYSTEM OF RAILWAY SIGNALING.
No. 486,634. Patented Nov. 22, 1892.
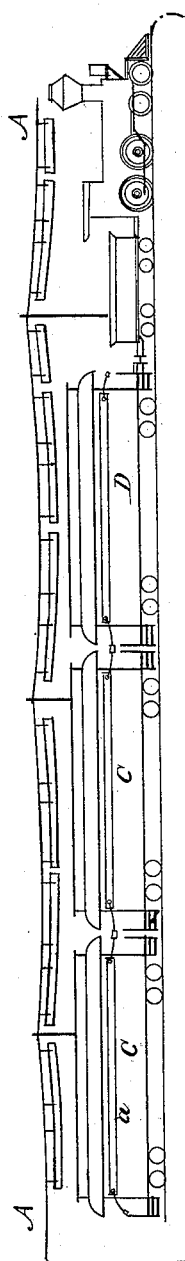
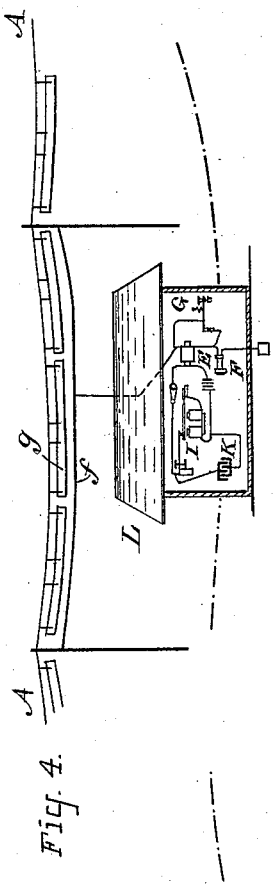
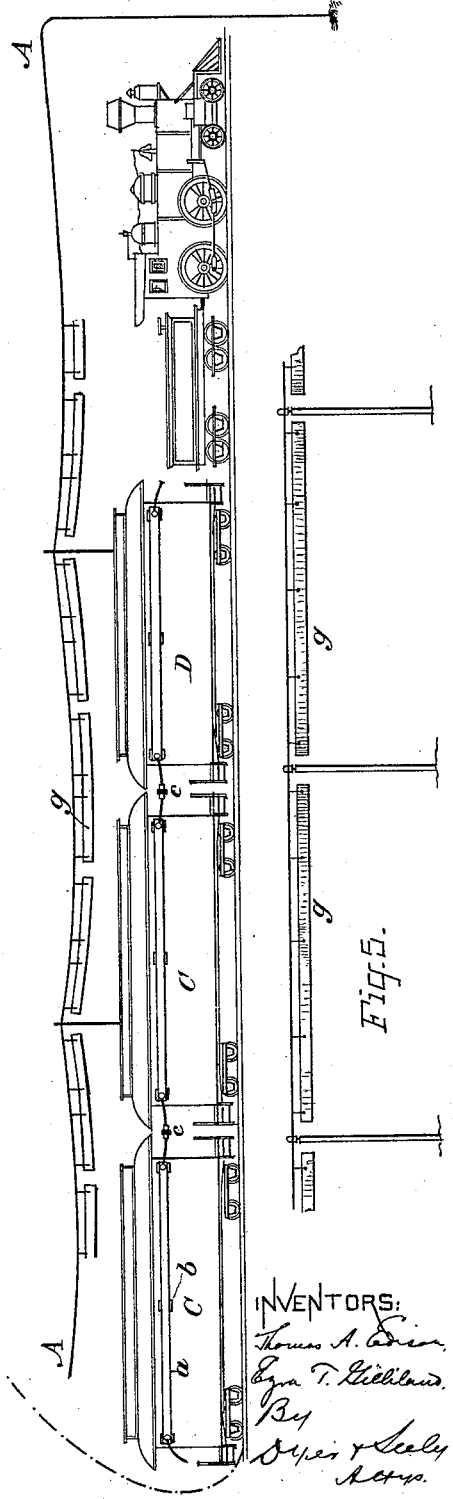

UNITED STATES PATENT OFFICE.

THOMAS A. EDISON, OF MENLO PARK, NEW JERSEY, AND EZRA T. GILLILAND, OF BOSTON, MASSACHUSETTS, ASSIGNORS, BY MESNE ASSIGNMENTS, TO THE CONSOLIDATED RAILWAY TELEGRAPH COMPANY, OF NEW YORK.

SYSTEM OF RAILWAY SIGNALING.

SPECIFICATION forming part of Letters Patent No. 486,634, dated November 22, 1892.

Application filed April 7, 1885. Serial No. 161,437. (No model.)

*To all whom it may concern:*

Be it known that we, THOMAS A. EDISON, of Menlo Park, in the county of Middlesex and State of New Jersey, and EZRA T. GILLILAND, of Boston, in the county of Suffolk and State of Massachusetts, have invented a certain new and useful Improvement in Systems of Railway Signaling, (Case A,) of which the following is a specification.

Our invention relates to apparatus for signaling electrically between a station and trains, or between two trains, by induction and without using traveling contacts of any character for maintaining electrical connection with the trains.

The object we have in view is to produce simple and efficient apparatus acting with constantly-open circuits upon the principle of static induction and employing that principle in the sending as well as in the receiving of signals.

In carrying out our invention we employ a line-wire, preferably run on poles along the railroad-track and grounded at its ends. Each car of a train is provided with strips of tin, galvanized iron, zinc, or other conducting material arranged longitudinally upon its exterior and supported off from the woodwork of the car by insulating-blocks of glass, so that there will be a thorough insulation of the strips. These strips may be about a foot wide (more or less) and will run the entire length of the car. They may be placed upon each side near the top of the car, or both at the top and bottom upon the sides of the car, and may also extend along the roof, the object being to get as large a surface well insulated from the car as can be conveniently obtained. The inductive strips of each car are connected electrically together, and the several cars of the train have their inductive strips connected electrically together by suitable couplings extending from car to car.

The signaling-office for the train is preferably located in the baggage-car, in which a wire is connected with the external inductive strips and runs through the transmitting and receiving apparatus, about to be described, to the truck, or to metal parts connected therewith, this wire being grounded through the wheels and track. In the line of this wire is located the secondary circuit of an induction-coil, which is wound for a high resistance—say one thousand ohms, more or less—and in series with the said secondary is arranged a telephone-receiver of high resistance, which may be an electro-magnetic or a chalk or motograph receiver. In the primary circuit of the induction-coil is located as a circuit-controller a vibrating musical reed which opens and closes this circuit rapidly and is kept in movement by an electro-magnet and a suitable battery. The contact-points are shunted by a condenser to reduce the spark and to sharpen the waves in the secondary. The primary circuit may also have a simple hand-switch for opening and closing the circuit. The secondary of the induction-coil is short-circuited by a key at its back point, which key is used for transmitting signals. Normally this key short-circuits the waves in the secondary and prevents inductive action upon the line along the track. By depressing this key the short circuit is opened and the induction takes place and continues as long as the key is depressed. This key, also by short-circuiting secondary of induction-coil, cuts the resistance of the induction-coil out of circuit in receiving.

It is designed to conduct the signaling upon the Morse system of dots and dashes, which can be produced by the length of depression of the key, such signals being received upon telephone-receivers.

In each signaling-station along the road similar apparatus to that described is used. The roof of the station may have the strips the same as a car connected through the apparatus in the station to ground or the strips may be supplanted by a wire run upon two or more of the poles in front of station, which carry the signaling-line, or the signaling-line may be connected by a wire running into the station with one side of a condenser in the station, the other side of the condenser being connected through the apparatus to ground. The strip upon the roof of the station or the wire run upon poles in front of station in proximity to but not connected with line-wire forms with the line-wire a condenser, and this is also true of the strips on the cars of a train and the line-wire.

The trains and the stations are connected with the line-wire by condensers arranged, so to speak, in "multiple arc," each of the grounded branch condenser-circuits having as a receiving-instrument a telephone and as a transmitting-instrument a vibrating reed acting through an induction-coil. The musical reed has the especial advantage in this connection of giving a rapid and uniform rate of vibration under all conditions, and hence is well adapted for transmitting inductively signals by dots and dashes. The line-wire may be an ordinary telegraph-wire grounded at its ends and run on poles between the tracks or at the side of the road; but we prefer to increase the inductive surface by hanging strips of thin sheet metal to the wire, with which construction it will be feasible to run the wire on poles at the side of the track, especially where the cars are provided on both sides with inductive strips.

In the accompanying drawings, forming a part hereof, Figure 1 is a view principally in diagram, showing the arrangement of signaling apparatus upon a train; Fig. 2, a side view of a car, broken away at one end and showing therein the signaling apparatus; Fig. 3, a sectional view of the inductive strips and insulator on opposite sides of a car; Fig. 4, a view, partly in diagram, showing two trains and a station in position for communication between the trains or between the station and either or both trains; Fig. 5, a view of the line-wire with increased inductive surface, and Fig. 6 a view showing a modified station arrangement.

Like letters and numerals denote corresponding parts in all the figures.

A A is a line-wire grounded at its ends, as shown in Fig. 4. The three parts of the line shown in this figure are continuous between the end ground-plates.

C D are the cars of a train having the external inductive strips $a$ supported upon glass insulated blocks $b$. The strips of the several cars are connected by couplings $c$. In the baggage-car D is the signal-office for the train, Fig. 2, the apparatus therein being shown on larger scale in Fig. 1. The wire 1 2 extends from inductive strips on car to truck, where it is grounded. E is the induction coil, the secondary circuit of which is in the line of this wire, as is also the telephone-receiver F. The secondary of E is shunted by circuit 3 4, which is closed at back point of key G. The primary of E includes a battery H, a musical vibrating reed I, and operating-magnet J. The reed closes circuit upon an adjustable spring $d$. A simple switch $e$ may also be located in this primary circuit. The contact-points and the magnet are shunted by a condenser K.

In each station L the apparatus is the same as on a train, as shown in Figs. 4 and 6. The station apparatus may be connected with inductive strips on station, or a wire $f$ on the poles of the line A A, Fig. 4, or a connection can be made from A A to a condenser M within the station, Fig. 6.

To increase inductive surface of line-wire A, A it is provided with strips $g$ of thin sheet metal, which are hung from the wire. There may be one strip in its space between the poles or two or more strips.

What we claim is—

1. In railway inductive signaling apparatus, the combination, with a grounded line-wire, a moving car, and an external condensing-surface upon said car, of a transmitting inductive coil and circuit-controller and a receiving-telephone carried by the car and located in a ground connection from said condensing-surface through the rails upon which the car travels, substantially as set forth.

2. In railway inductive signaling apparatus, the combination, with a grounded line-wire, a moving car, and an external condensing-surface upon said car, of a transmitting induction-coil and musical vibrator and a receiving-telephone carried by the car and located in a ground connection from said condensing-surface through the rails upon which the car travels, substantially as set forth.

3. In railway inductive signaling apparatus, the transmitter having, in combination, an induction-coil with secondary in induction-circuit, a circuit-controller, and local battery in the primary of the coil, and a key short-circuiting the secondary, substantially as set forth.

4. In railway inductive signaling apparatus, the transmitter having, in combination, an induction-coil with secondary in induction-circuit, a musical vibrator, and local battery in the primary of the coil, and a key short-circuiting the secondary, substantially as set forth.

5. In railway inductive signaling apparatus, the transmitter having, in combination, an induction-coil, a vibrator, and local battery in primary of coil, and a condenser shunting points of vibrator, and a device for varying the circuit to make signals, substantially as set forth.

6. In railway inductive signaling apparatus, the combination, with a grounded line-wire, of a moving car having an external condensing-surface and signal transmitting and receiving instruments located in a ground connection from such condensing-surface through the rails upon which the car travels, and a station having, also, signal transmitting and receiving instruments located in a grounded circuit, connected by a condensing-surface with said line, substantially as set forth.

7. In railway inductive signaling apparatus, the combination, with a grounded line-wire, of a moving car having an external condensing-surface and a signal-transmitting circuit-controller and a receiving-telephone located in a ground connection from such condensing-surface through the rails upon which the car travels, and a station having, also, a signal-transmitting circuit-controller, and a receiving-telephone located in a grounded circuit, connected by a condensing-surface with said line, substantially as set forth.

8. In railway inductive signaling apparatus, the combination of inductive strips upon two or more cars coupled together with signal transmitting and receiving apparatus located upon one car and connected with the inductive strips thereof, substantially as set forth.

This specification signed and witnessed by the said EDISON on the 27th day of March, 1885, and by the said GILLILAND on the 28th day of March, 1885.

THOMAS A. EDISON.
EZRA T. GILLILAND.

Witnesses as to signature of T. A. Edison:
A. W. KIDDLE,
E. C. ROWLAND.

Witnesses as to signature of E. T. Gilliland:
GEO. WILLIS PIERCE,
THOS. D. LOCKWOOD.